US009886975B2

(12) United States Patent
Yang et al.

(10) Patent No.: US 9,886,975 B2
(45) Date of Patent: Feb. 6, 2018

(54) HARD DISK DRIVE AND PIVOT ASSEMBLY BEARING DEVICE

(71) Applicant: MINEBEA CO., LTD., Nagano (JP)

(72) Inventors: Weihong Yang, Yokohama (JP); Daiki Kobayashi, Tokyo (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 0 days.

(21) Appl. No.: 15/263,943

(22) Filed: Sep. 13, 2016

(65) Prior Publication Data

US 2017/0084297 A1    Mar. 23, 2017

(30) Foreign Application Priority Data

Sep. 17, 2015    (JP) .................................. 2015-184133

(51) Int. Cl.
*G11B 5/48*  (2006.01)
*G11B 19/20* (2006.01)

(52) U.S. Cl.
CPC ........ *G11B 5/4813* (2013.01); *G11B 19/2036* (2013.01)

(58) Field of Classification Search
CPC ...... G11B 5/4813; G11B 5/48; G11B 19/2036
USPC .............................................. 360/265–265.7
See application file for complete search history.

(56) References Cited

U.S. PATENT DOCUMENTS

| 5,315,465 A | 5/1994 | Blanks |
| 7,341,379 B2 | 3/2008 | Koyama |
| 2005/0248886 A1* | 11/2005 | Culver .................. G11B 5/5569 |
| | | 360/265.6 |
| 2016/0118068 A1* | 4/2016 | Kaneko .................. F16C 33/762 |
| | | 360/265.6 |

FOREIGN PATENT DOCUMENTS

| JP | H05-205413 A | 8/1993 |
| JP | H06-096570 A | 4/1994 |
| JP | H06-068155 U | 9/1994 |
| JP | 2004-092666 A | 3/2004 |
| JP | 2006-077924 A | 3/2006 |
| JP | 2008-144783 A | 6/2008 |
| JP | 2013-048005 A | 3/2013 |

OTHER PUBLICATIONS

Apr. 25, 2017 Office Action issued in Japanese Patent Application No. 2015-184133.

* cited by examiner

Primary Examiner — Allen T Cao
(74) Attorney, Agent, or Firm — Oliff PLC (57) ABSTRACT

A hard disk drive according to an embodiment of the present invention includes a pivot assembly bearing device with a shaft, rolling bearings and a sleeve, a cylindrical convex portion formed in a cover member at the upper side, protruding inward, and fixed to an upper end surface of the shaft, a convex portion formed on a base member at the lower side, protruding inward, and fixed to a lower end surface of the shaft, and a labyrinth gap formed by opposing an outer peripheral surface of the convex portion to an inner peripheral surface of a sleeve in a radial direction and/or by opposing an outer peripheral surface of the convex portion to the inner peripheral surface of the sleeve in a radial direction.

11 Claims, 13 Drawing Sheets

HARD DISK DRIVE AND PIVOT ASSEMBLY BEARING DEVICE

CROSS-REFERENCE TO RELATED APPLICATION(S)

The present application claims priority to and incorporates by reference the entire contents of Japanese Patent Application No. 2015-184133 filed in Japan on Sep. 17, 2015.

BACKGROUND OF THE INVENTION

1. Field of the Invention

The present invention relates to a hard disk drive including a pivot assembly bearing device, and a pivot assembly bearing device.

2. Description of the Related Art

Figure 12:
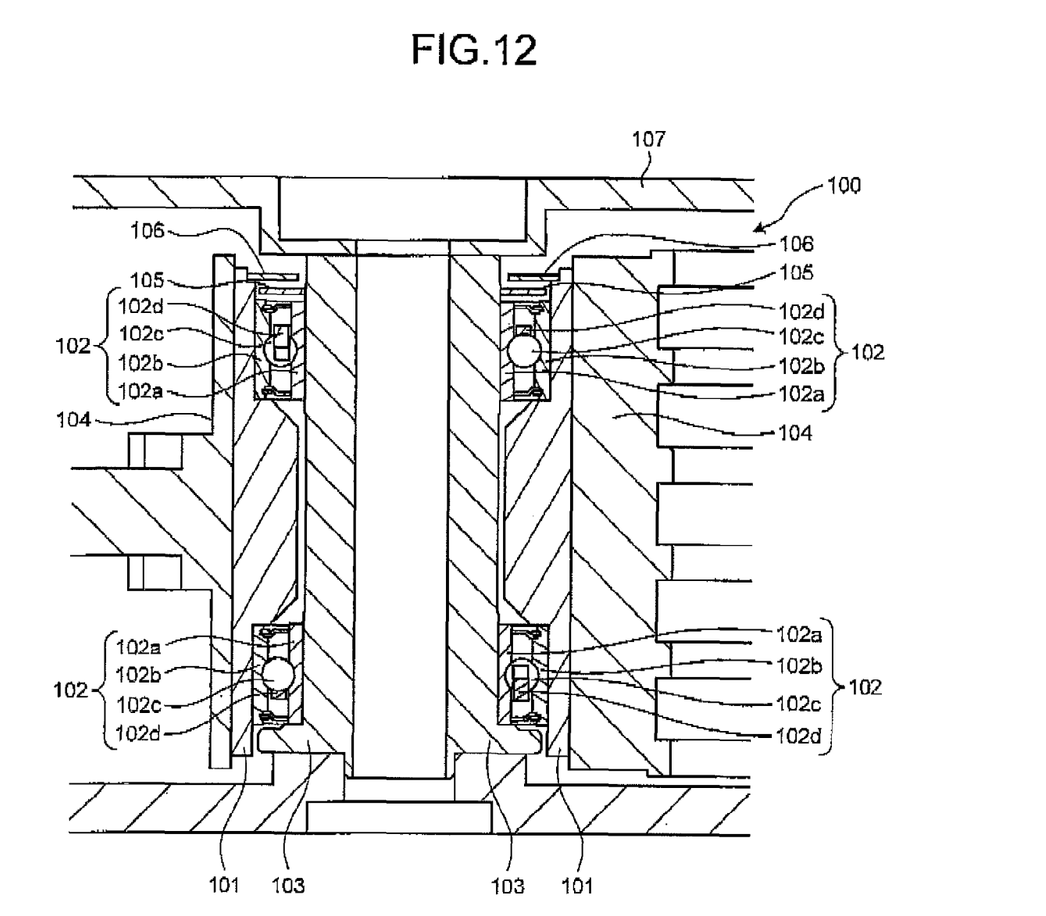
FIG. 12 is a cross-sectional view of a configuration of a conventional pivot assembly bearing device.

Hard disk drives are conventionally known, which have a pivot assembly bearing device configured to support a swing arm having a magnetic head for recording and reproducing signals. FIG. 12 is a cross-sectional view of a configuration of a conventional pivot assembly bearing device. As illustrated in FIG. 12, the conventional pivot assembly bearing device 100 has a configuration in which a cylindrical sleeve 101 relatively rotatably supports a cylindrical shaft 103 through a pair of axially-spaced rolling bearings 102 each including an inner race 102a, an outer race 102b, and rolling bodies 102c. The pivot assembly bearing device 100 having such a configuration fixes the shaft 103 to a base member of a hard disk drive, fits the sleeve 101 into a mounting hole 104 formed in a swing arm and swingably supports the swing arm.

With recent increase in processing speed, and capacity and density of information recorded in hard disk drives, the distance between a magnetic head and a magnetic disk has been reduced, and even fine foreign matter which has not been so significant causes failure of the hard disk drives. Thus, it is increasingly important to maintain cleanliness in the hard disk drives. The rolling bearing uses lubricant, but out-particles are generated by gasification or microparticulation of the lubricant, and a technique for keeping the out-particles from reducing cleanliness in a hard disk drive is demanded. In consideration of such a background, a pivot assembly bearing device is proposed, which keeps out-particles from reducing cleanliness in a hard disk drive (e.g., see Japanese Patent Application Laid-open No. 2013-48005). In particular, a technique is proposed in which sealing plates 105 and 106 are disposed at an upper end portion of the sleeve 101 to form a labyrinth gap, and the out-particles are kept from scattering outside the pivot assembly bearing device 100, as illustrated in FIG. 12.

Figure 13:
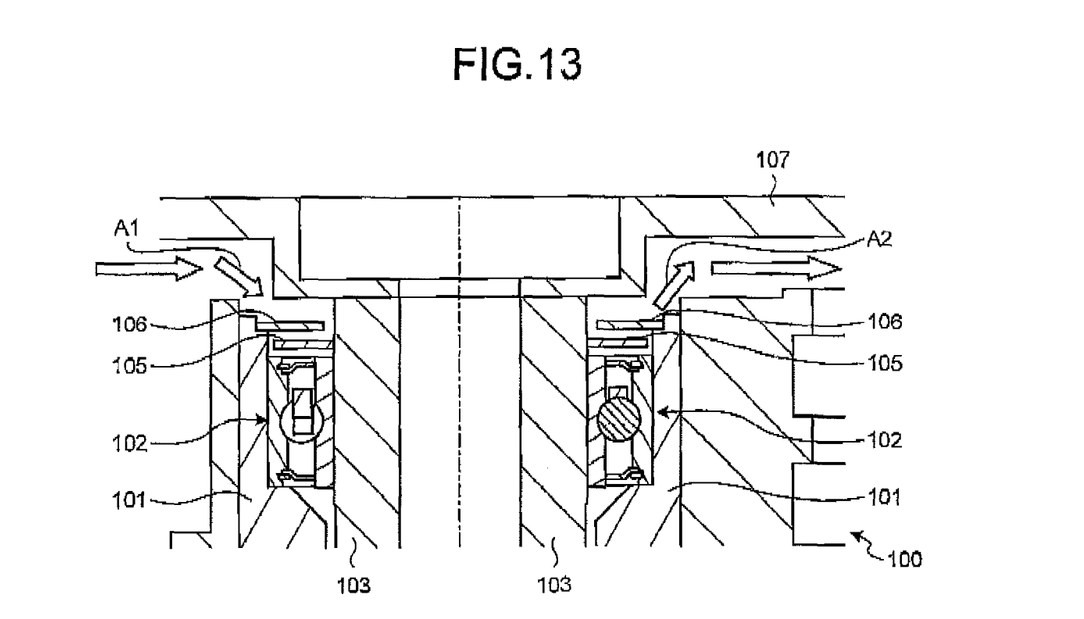
FIG. 13 is a schematic diagram illustrating airflow around the conventional pivot assembly bearing device.

However, as a result of an extensive study, the inventors of the present invention have found that even if sealing performance of a single pivot assembly bearing device is improved, scattering of the out-particles outside the pivot assembly bearing device cannot be effectively suppressed. FIG. 13 is a schematic diagram illustrating airflow around the conventional pivot assembly bearing device. In the hard disk drives, airflow is generally generated around the magnetic disk with the rotation of the magnetic disk. As indicated by an arrow A1 in FIG. 13, airflow passing through the pivot assembly bearing device partially flows into the pivot assembly bearing device 100, from a gap between a cover member 107 of the hard disk drive and an axial end surface of the sleeve 101. Airflow flowing into the pivot assembly bearing device 100 is discharged from the pivot assembly bearing device 100 to the outside, as indicated by an arrow A2 in FIG. 13. Therefore, the out-particles retained in the pivot assembly bearing device 100 are scattered outside the pivot assembly bearing device 100 by this airflow, and the scattered particles reduce the cleanliness in the hard disk drive.

SUMMARY OF THE INVENTION

It is an object of the present invention to at least partially solve the problems in the conventional technology.

A hard disk drive according to one aspect of the present invention may include a pivot assembly bearing device, the pivot assembly bearing device having a rolling bearing, a shaft and a sleeve and supporting a swing arm, the rolling bearing having an outer race and an inner race, the shaft having an outer peripheral surface on which the inner race is fixed, the sleeve having an inner peripheral surface on which the outer race is fixed. The hard disk drive comprises: a first convex portion that is cylindrical and/or a second convex portion that is cylindrical, the first convex portion being formed on a cover member positioned on an upper side of the hard disk drive, protruding toward an inside of the hard disk drive, and being fixed to an upper end surface of the shaft, the second convex portion being formed on a base member being positioned on a lower side of the hard disk drive, protruding toward an inside of the hard disk drive, and being fixed to a lower end surface of the shaft, an outer peripheral surface of the first convex portion and/or an outer peripheral surface of the second convex portion being opposed to an inner peripheral surface of the sleeve in a radial direction to form a labyrinth gap.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A configuration and operation of a hard disk drive according to an embodiment of the present invention is described below with reference to the drawings. In the following description, the terms such as "upper" and "lower" are only used to indicate directions in the drawings, and the terms are not intended to limit the position of the hard disk drive in the present invention.

Overall Configuration of Hard Disk Drive

First, an overall configuration of the hard disk drive according to an embodiment of the present invention is described with reference to FIG. 1.

Figure 1:
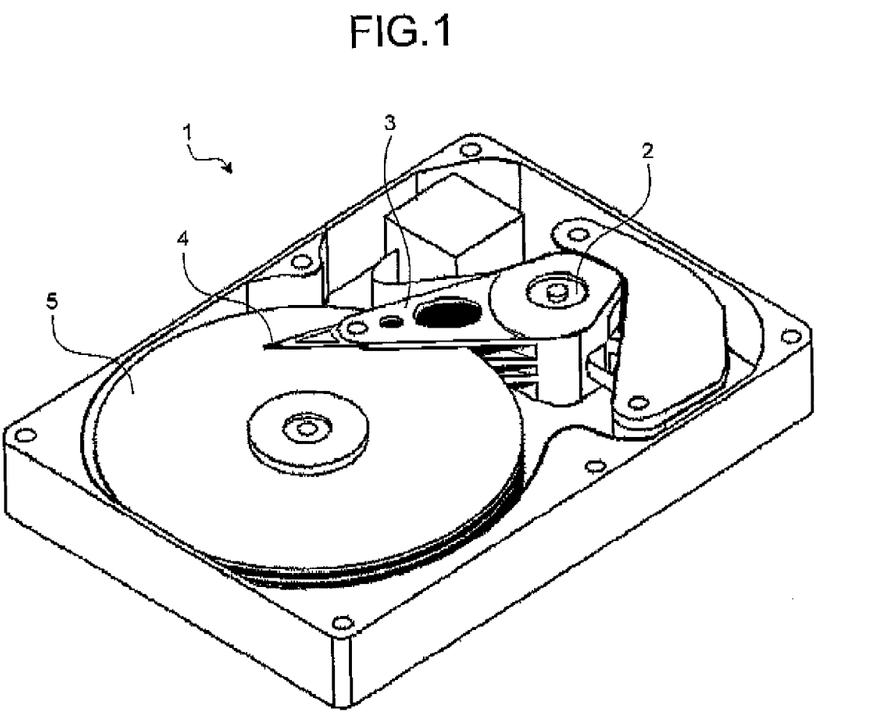
FIG. 1 is a perspective view of an overall configuration of a hard disk drive according to an embodiment of the present invention.

FIG. 1 is a perspective view of the overall configuration of the bard disk drive according to an embodiment of the present invention. As illustrated in FIG. 1, a hard disk drive 1 according to an embodiment of the present invention includes a swing arm 3 swingably supported by a pivot assembly bearing device 2 fitted into a mounting hole. The pivot assembly bearing device 2 is described later. In this hard disk drive 1, a magnetic head 4 disposed at an end of the swing arm 3 moves on a magnetic disk 5 being rotated, records information on the magnetic disk 5, and reads the information recorded in the magnetic disk 5.

Configuration of Pivot Assembly Bearing Device

First Embodiment

Figure 2:
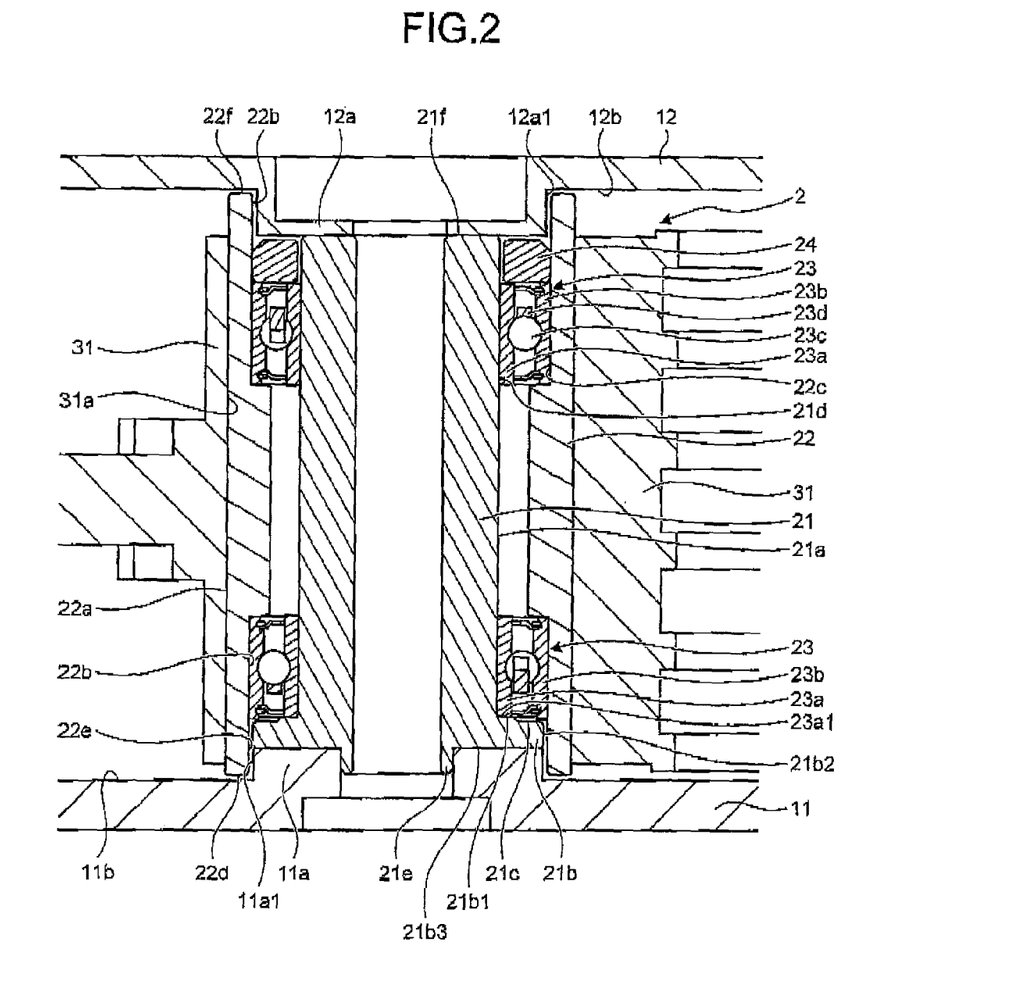
FIG. 2 is a cross-sectional view of a configuration of a pivot assembly bearing device according to a first embodiment of the present invention.
Figure 3:
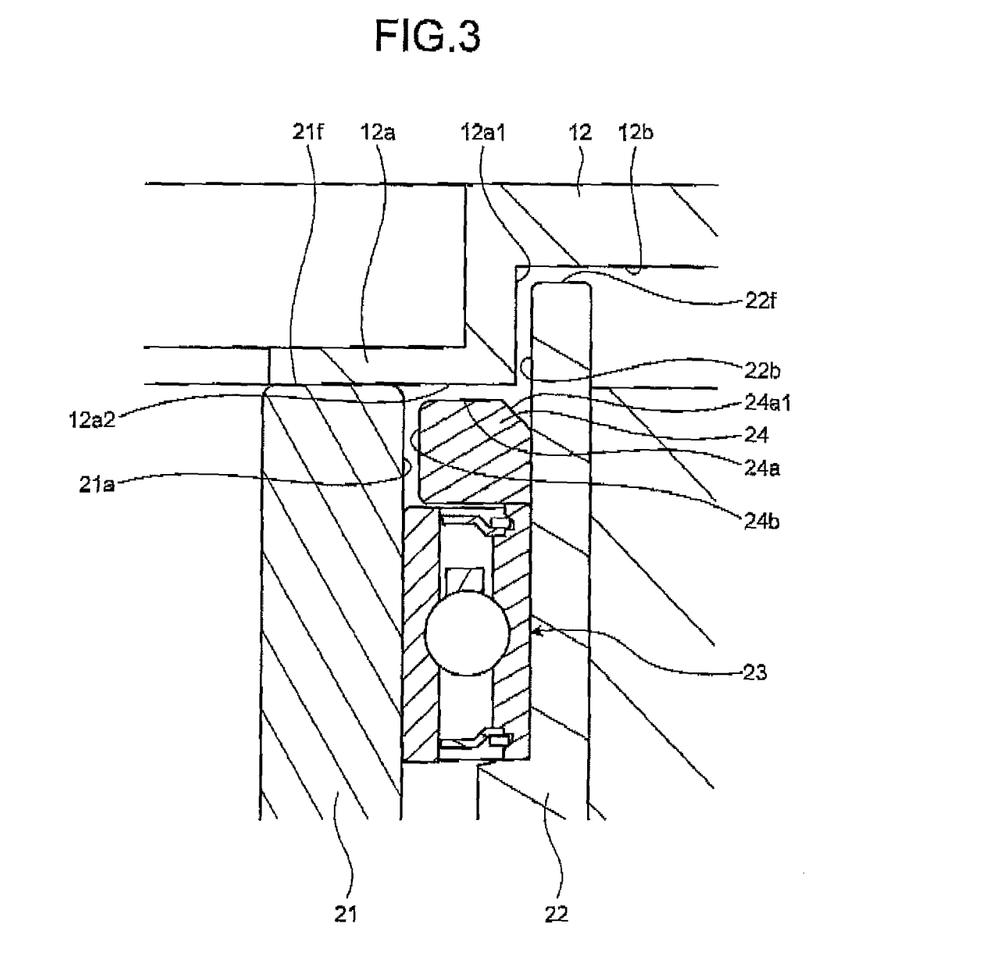
FIG. 3 is a partially enlarged cross-sectional view of a configuration around a rolling bearing in the pivot assembly bearing device illustrated in FIG. 2.
Figure 4:
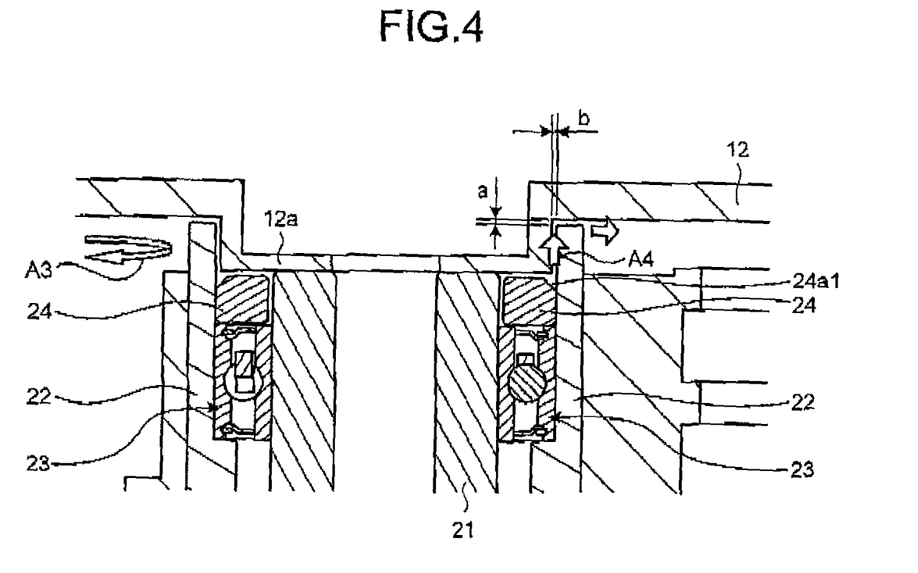
FIG. 4 is a schematic diagram illustrating airflow around the pivot assembly bearing device according to the first embodiment of the present invention.

Next, a configuration of the pivot assembly bearing device according to a first embodiment of the present invention is described with reference to FIGS. 2 to 4. FIG. 2 is a cross-sectional view of the configuration of the pivot assembly bearing device according to the first embodiment of the present invention. FIG. 3 is a partially enlarged cross-sectional view of a configuration around a rolling bearing in the pivot assembly bearing device illustrated in FIG. 2. FIG. 4 is a schematic diagram illustrating airflow around the pivot assembly bearing device according to the first embodiment of the present invention.

As illustrated in FIG. 2, the pivot assembly bearing device 2 according to the first embodiment of the present invention includes a pair of upper and lower rolling bearings 23 disposed between a cylindrical shaft 21 and a cylindrical sleeve 22. Each of the rolling bearings 23 includes an inner race 23a fixedly bonded on en outer peripheral surface 21a of the shaft 21, an outer race 23b fixedly bonded on an inner peripheral surface 22b of the sleeve 22, a plurality of rolling bodies 23c provided between the inner race 23a and the outer race 23b, and an annular holder 23d configured to hold the rolling bodies 23c. The sleeve 22 is longer than the shaft 21, and has an upper end surface 22f disposed to be positioned above an upper end surface 21f of the shaft 21, and a lower and surface 22d disposed to be positioned below a lower surface of an outer flange 21b of the shaft 21 which is described later. Such a configuration allows the pivot assembly bearing device 2 incorporated into the hard disk drive to form a labyrinth gap as described later.

The shaft 21 is a cylindrical member having an outer flange 21b radially protruding, at a lower end portion. The outer flange 21b has an upper surface 21b1 on the inner peripheral side, and a lower end surface 23a1 of the inner race 23a of the upper rolling bearing 23 disposed on the axially lower side abuts on the upper surface 21b1. By this way, the inner race 23a of the rolling bearing 23 at the axially lower side is positioned with respect to the shaft 21 in the vertical direction (axial direction). The outer flange 21b has an outer peripheral surface 21b2 disposed opposite to the inner peripheral surface 22b of the sleeve 22 through a gap. The outer flange 21b has an upper surface on the outer peripheral side, and an annular stepped portion 21c is formed on the upper surface to avoid making contact with the outer race 23b of the rolling bearing 23 disposed on the axially lower side.

The outer flange 21b has a lower surface 21b3 fixed on an upper surface (protruding surface) of a cylindrical convex portion 11a (second convex portion). The cylindrical convex portion 11a is formed on a base member 11 positioned on the lower side of the hard disk drive 1, and protruding toward the inside of a casing of the hard disk drive 1. An annular bonding area 21d extending in a circumferential direction is formed at a position on the outer peripheral surface 21a of the shaft 21, corresponding to each of the rolling bearings 23 disposed vertically. A boss 21e and a through-hole disposed coaxially with the shaft 21 are provided in a lower end surface of the shaft 21. The boss 21e is fitted to an inner peripheral surface of the convex portion 11a. Screw threads are formed in an upper end portion and a lower end portion of the through-hole, and screws not illustrated are tightened into the screw threads. Therefore, the pivot assembly bearing device 2 is fixed to the base member 11 on the lower side of the hard disk drive 1 through the convex portion 11a, and is fixed to a cover member 12 on the upper side of the hard disk drive device through a convex portion 12a.

The sleeve 22 has an outer peripheral surface 22a fixedly fitted into an inner peripheral surface 31a of a mounting hole 31 formed in the swing arm 3 (see FIG. 1). A fixing method includes bonding, press-fitting, or a tolerance ring, but any of them may be used. A pair of upper and lower outer race fitting portions 22c to which the outer races 23b of the rolling bearings 23 are fitted is formed in the inner peripheral surface 22b of the sleeve 22, and the outer races 23b of the pair of upper and lower rolling bearings 23 are correspondingly fitted to outer race fitting portions 22c. Therefore, the pair of the rolling bearings 23 is positioned with respect to the sleeve 22 in the axial direction (vertical direction), and an axial distance (vertical interval) between the upper and lower rolling bearings 23 is held at a predetermined distance. Note that the outer flange 21b of the shaft 21 has an outer diameter set smaller than a diameter of the outer race fitting portion 22c of the sleeve 22, and larger than an inner diameter of the outer race 23b of the rolling bearing 23.

The lower end surface 22d of the sleeve 22 is opposed to an inner surface 11b of the base member 11 through a gap. Furthermore, the sleeve 22 has a lower inner peripheral surface 22e opposed to an outer peripheral surface 11a1 of the convex portion 11a through a gap. Thus, the labyrinth gap having a plurality of bent portions is formed between the outer peripheral surface 21b2 of the outer flange 21b and the outer peripheral surface 11a1 of the convex portion 11a, and the lower inner peripheral surface 22e of the sleeve 22, and between the lower end surface 22d of the sleeve 22 and the inner surface 11b of the base member 11.

As illustrated in FIG. 3, in a space between the outer peripheral surface 21a of the shaft 21 and the inner peripheral surface 22b of the sleeve 22, an annular sealing member 24 is disposed at an upper portion of the upper rolling bearing 23. An inclined surface is formed at a corner between an upper surface 24a and an outer peripheral surface of the sealing member 24 to provide a cut-out portion 24a1. The sealing member 24 has an upper surface 24a which is disposed opposite to a lower surface 12a2 (protruding surface) of the convex portion 12a (example of first convex portion), through a gap. The convex portion 12a (example of first convex portion) is formed on the cover member 12 positioned on the upper side of the hard disk drive 1, and protrudes toward the inside of the hard disk drive 1. Furthermore, the outer peripheral surface of the sealing member 24 is fixedly bonded to the inner peripheral surface 22b of the sleeve 22, and further an inner peripheral surface 24b of the sealing member 24 is disposed opposite to the outer peripheral surface 21a of the shaft 21, through a gap. The sealing member 24 has a lower surface abutting on the outer race 23b of the rolling bearing 23. Since a preload is applied to the rolling bearing 23, an end surface of the inner race 23a is positioned slightly lower than an end surface of the outer race 23b. Therefore, a minute gap communicating with the labyrinth gap is formed between the lower surface of the sealing member 24 and the end surface of the inner race.

The inner peripheral surface 22b of the sleeve 22 is opposed to an outer peripheral surface 12a1 of the convex portion 12a of the cover member 12 through a gap. The upper end surface 22f of the sleeve 22 is opposed to an inner surface 12b of the cover member 12 through a gap. Thus, the labyrinth gap having a plurality of bent portions is formed between the outer peripheral surface 21a of the shaft 21 and the inner peripheral surface 24b of the sealing member 24, between the lower surface 12a2 of the convex portion 12a and the upper surface 24a of the sealing member 24, between the inner peripheral surface 22b of the sleeve 22 and the outer peripheral surface 12a1 of the convex portion 12a, and between the upper end surface 22f of the sleeve 22 and the inner surface 12b of the cover member 12.

As indicated by the arrow A3 in FIG. 4, according to the hard disk drive 1 having such a configuration, the labyrinth gap having the plurality of bent portions formed by opposing the inner peripheral surface 22b of the sleeve 22 to the convex portion 12a of the cover member 12 avoids airflow generated around the magnetic disk 5 due to the rotation of the magnetic disk 5 entering the pivot assembly bearing device 2. Further, even if the airflow enters the pivot assembly bearing device 2, as the labyrinth gap has the plurality of bent portions with a narrow gap width, the flow rate of the airflow is reduced. Still further, as indicated by the arrow A4 in FIG. 4, the labyrinth gap formed by the shaft 21, the sleeve 22, the sealing member 24, and the cover member 12 can minimize discharge of the airflow, and the rate of airflow discharged from the pivot assembly bearing device 2 to the outside can be further reduced. Still another further, the cut-out portion 24a1 formed at an upper portion of the sealing member 24 forms an enlarged gap portion at an intermediate portion of the labyrinth gap. The flow rate of the airflow is reduced in the enlarged gap portion, and the flow rate of the airflow is further reduced in the proximity of the outlet, and thus, the flow rate of the airflow discharged from the pivot assembly bearing device 2 to the outside can be further reduced. In the present embodiment, the cut-out portion 24a1 is provided in the corner between the upper surface 24a and the outer peripheral surface of the sealing member 24, but the cut-out portion 24a1 may be provided between the upper surface 24a and the inner peripheral surface of the sealing member 24.

Therefore, the out-particles retained in the pivot assembly bearing device 2 can be kept from being scattered by airflow to the outside of the pivot assembly bearing device 2, and thus the cleanliness in the hard disk drive 1 can be kept from being deteriorated by the scattered out-particles. In FIG. 4, only airflow in an upper portion of the hard disk drive 1 is illustrated, but also in a lower portion of the hard disk drive 1, the labyrinth gap is formed by the sleeve 22, and the convex portion 11a of the base member 11. Therefore, also in the lower portion of the hard disk drive 1, the flow rate of the airflow discharged from the pivot assembly bearing device 2 to the outside is reduced, and the out-particles can be kept from being scattered by the airflow to the outside of the pivot assembly bearing device 2. Furthermore, in the present embodiment, the labyrinth gaps are formed at both of the upper and lower portions of the hard disk drive 1, but the labyrinth gap may be formed at any of the upper and lower portions of the hard disk drive 1.

First Modification

Figure 5:
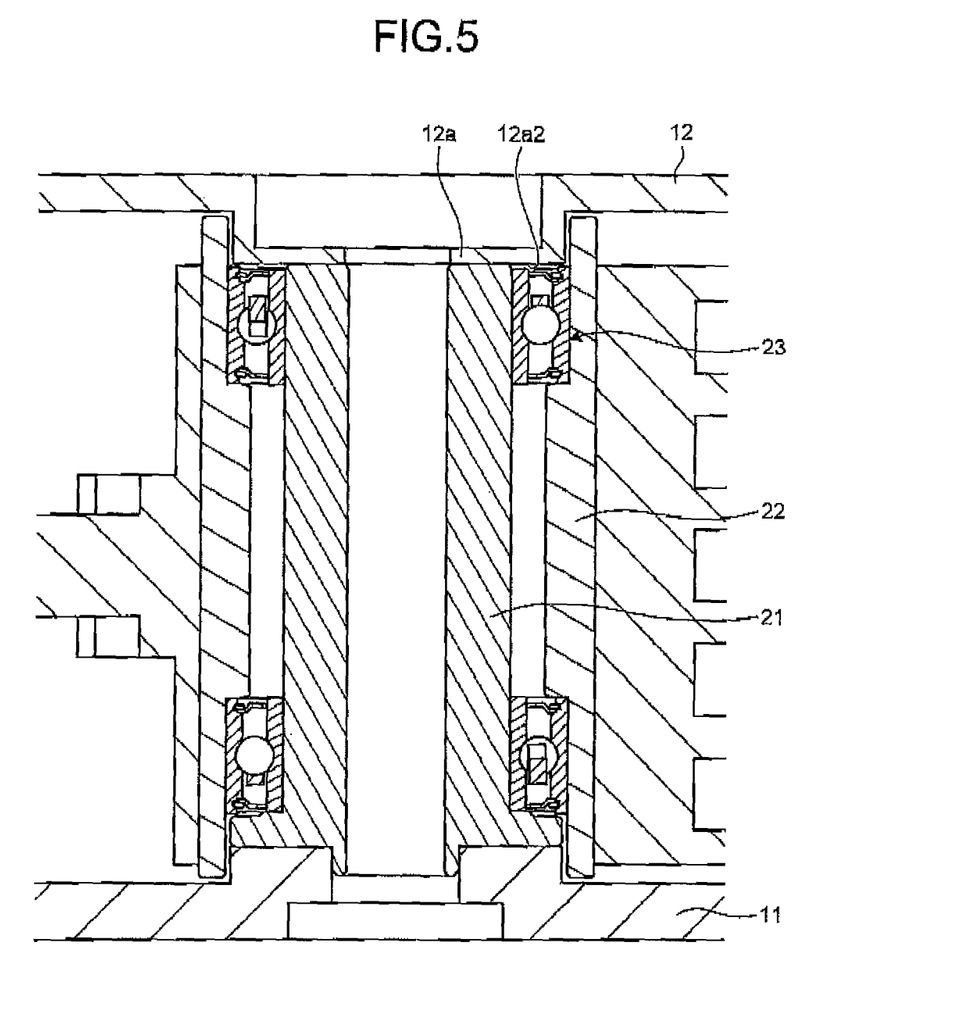
FIG. 5 is a cross-sectional view of a configuration of a modification of the pivot assembly bearing device illustrated in FIG. 2.

FIG. 5 is a cross-sectional view of a configuration of a modification of the pivot assembly bearing device illustrated in FIG. 2. In the above embodiment, the annular sealing member 24 is disposed at the upper portion of the upper rolling bearing 23, but, as illustrated in FIG. 5, the sealing member 24 may be omitted so that an upper end surface of the upper rolling bearing 23 may be disposed opposite to the lower surface 12a2 (protruding surface) of the convex portion 12a of the cover member 12. In such a configuration, since the labyrinth gap is formed between the sleeve 22 and the cover member 12, the out-particles retained in the pivot assembly bearing device 2 can be kept from being scattered by airflow to the outside of the pivot assembly bearing device 2. Furthermore, according to such a configuration, a distance between the upper rolling bearing 23 and the lower rolling bearing 23 can be increased by the thickness of the omitted sealing member 24, and axial rigidity of the pivot assembly bearing device 2 can be increased. Alternatively, the whole length of the sleeve 22 can be reduced by the thickness of the omitted sealing member 24, and thus, the hard disk drive advantageously can have a reduced thickness.

Second Modification

Figure 6:
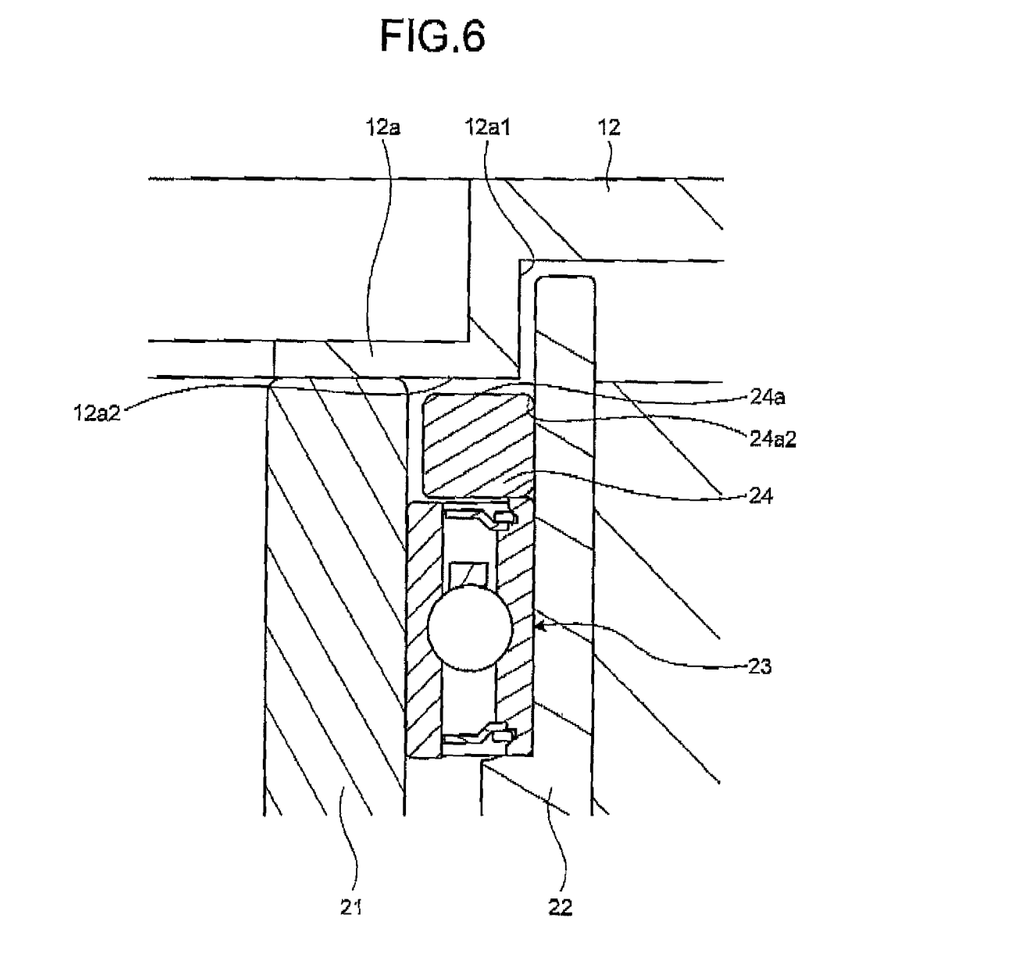
FIG. 6 is a cross-sectional view of a configuration of a modification of a cut-out portion illustrated in FIG. 3.
Figure 7:
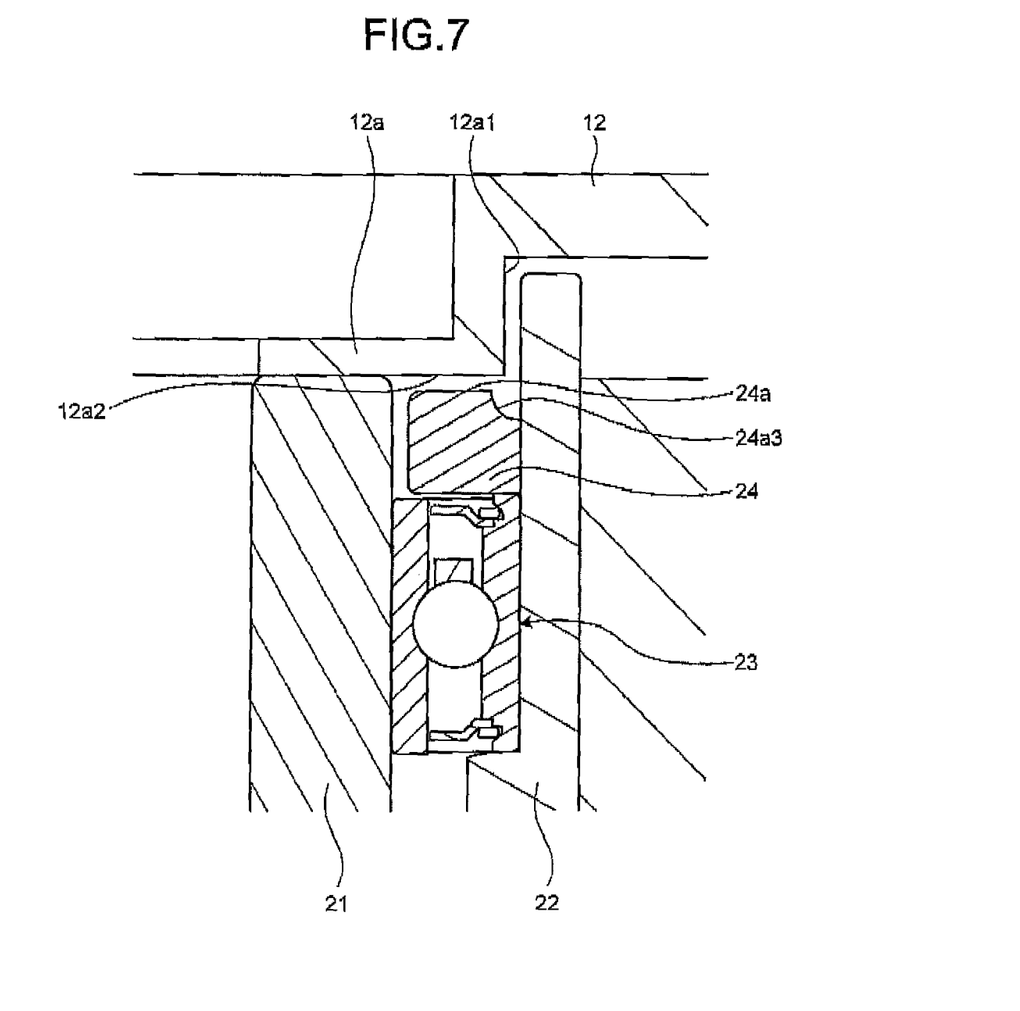
FIG. 7 is a cross-sectional view of a configuration of a modification of the cut-out portion illustrated in FIG. 3.
Figure 8:
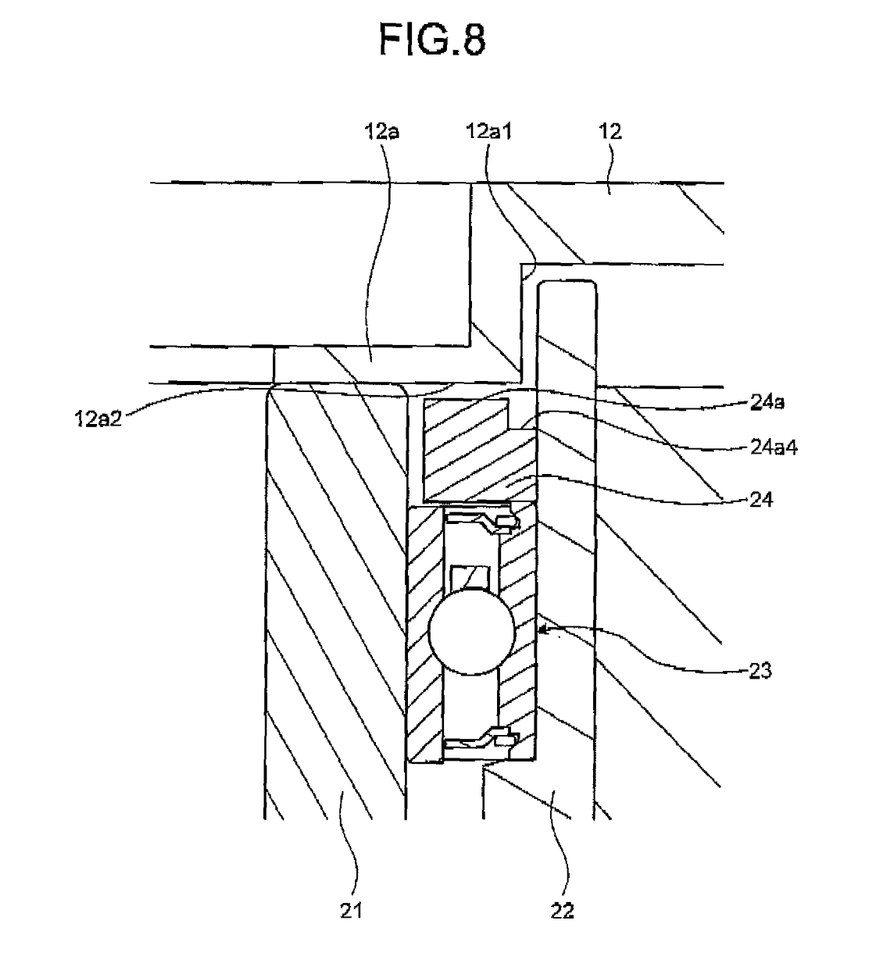
FIG. 8 is a cross-sectional view of a configuration of a modification of the cut-out portion illustrated in FIG. 3.

FIGS. 6 to 8 are cross-sectional views of configurations of modifications of the cut-out portion illustrated in FIG. 3. In the first embodiment, the inclined surface is formed at a corner of the upper surface 24a of the sealing member 24 to provide the cut-out portion 24a1. However, as illustrated in FIG. 6 or 7, a curved surface instead of the inclined surface may be formed at a corner of the upper surface 24a of the sealing member 24 to provide a cut-out portion 24a2 or 24a3. Further, as illustrated in FIG. 8, a step may be formed at a corner of the upper surface 24a of the sealing member 24 to form a cut-out portion 24a4. The cut-out portion may be formed also in the inner peripheral surface of the sealing member 24. As described above, the cut-out portion may be formed into any shape and at any position, as long as the cut-out portion is formed in the upper surface 24a or the inner peripheral surface of the sealing member 24, the enlarged gap portion is formed in the intermediate portion of the labyrinth gap, and the enlarged gap portion reduces the flow rate of the airflow.

Second Embodiment

Figure 9:
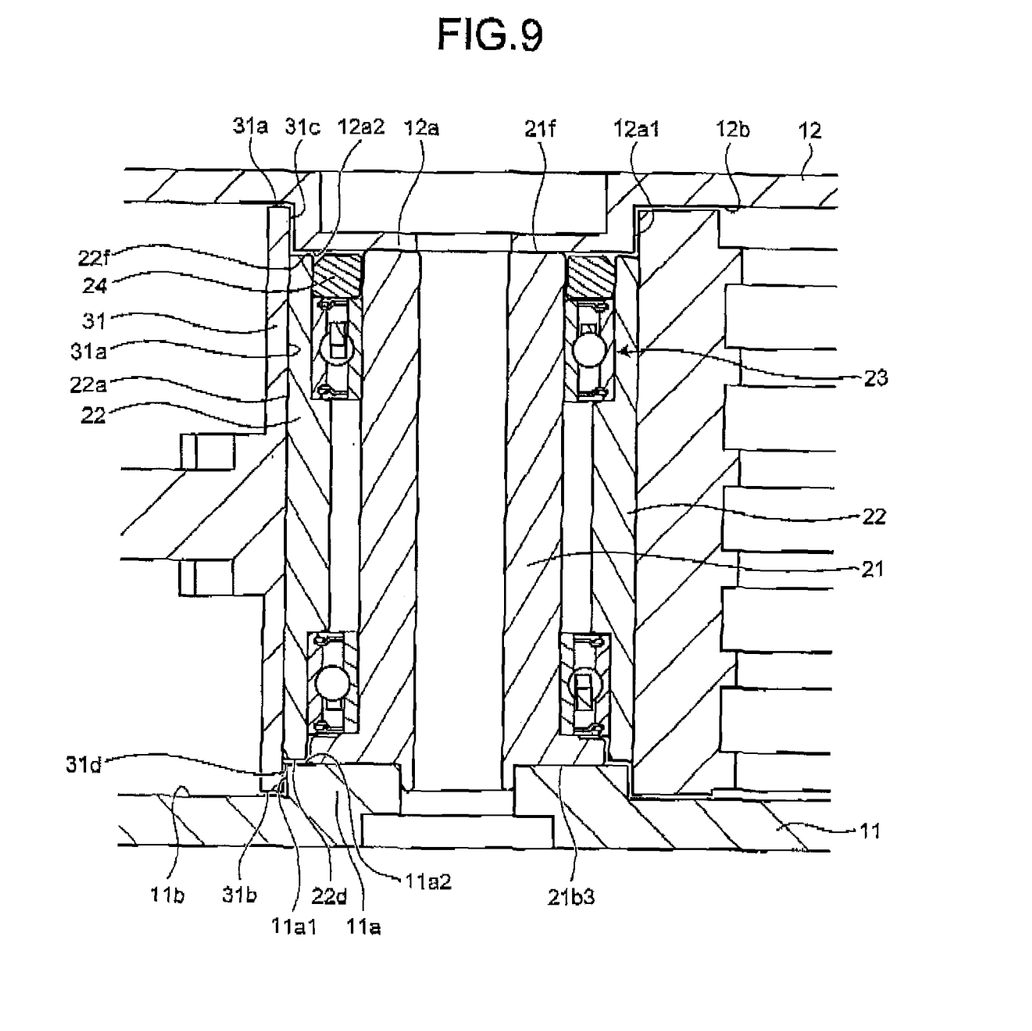
FIG. 9 is a cross-sectional view of a configuration of a pivot assembly bearing device according to a second embodiment of the present invention.

Next, a configuration of a pivot assembly bearing device according to a second embodiment of the present invention is described with reference to FIG. 9. FIG. 9 is a cross-sectional view of a configuration of the pivot assembly bearing device according to the second embodiment of the present invention. The pivot assembly bearing device according to the second embodiment of the present invention is different from the pivot assembly bearing device according to the first embodiment only in configurations of the sleeve 22 and the mounting hole 31 of the swing arm. Thus, only the configurations of the sleeve 22 and the mounting hole 31 of the swing arm are described below.

As illustrated in FIG. 9, in the present embodiment, the lower end surface 22$d$ of the sleeve 22 is disposed, through a gap, opposite to an upper surface 11$a$2 (protruding surface) of convex portion 11$a$ formed at the base member 11 on the lower side, and the upper end surface 22$f$ of the sleeve 22 is disposed, through a gap, opposite to the lower surface 12$a$2 (protruding surface) of the convey portion 12$a$ formed on the cover member 12 on the upper side. Further, an upper end portion 31$a$ and a lower end portion 31$b$ around the mounting hole 31 are disposed, through gaps, opposite to the inner surface 12$b$ of the cover member 12 and the inner surface 11$b$ of the base member 11, respectively. Still further, an upper inner peripheral surface 31$c$ and a lower inner peripheral surface 31$d$ of the mounting hole 31 are disposed, through gaps, opposite to the outer peripheral surface 12$a$1 of the convex portion 12$a$ and the outer peripheral surface 11$a$1 of the convex portion 11$a$.

As described above, in the present embodiment, a labyrinth gap is formed on the upper side of the pivot assembly bearing device 2, between the upper end portion 31$a$ around the mounting hole 31 and the inner surface 12$b$ of the cover member 12, the upper inner peripheral surface 31$c$ of the mounting hole 31 and the outer peripheral surface 12$a$1 of the convex portion 12$a$, and the upper end surface 22$f$ of the sleeve 22 and the lower surface 12$a$2 (protruding surface) of the convex portion 12$a$. Furthermore, a labyrinth gap is formed on the lower side of the pivot assembly bearing device 2, between the lower end portion 31$b$ around the mounting hole 31 and the inner surface 11$b$ of the base member 11, the lower inner peripheral surface 31$d$ of the mounting hole 31 and the outer peripheral surface 11$a$1 of the convex portion 11$a$, and the lower end surface 22$d$ of the sleeve 22 and the upper surface 11$a$2 of the convex portion 11$a$.

Therefore, also in the present embodiment, the out-particles retained in the pivot assembly bearing device 2 can be kept from being scattered by airflow to the outside of the pivot assembly bearing device 2, and thus the cleanliness in the hard disk drive 1 can be kept from being deteriorated by the out-particles. Furthermore, in the present embodiment, the labyrinth gaps are formed at both of the upper and lower portions of the hard disk drive 1, but the labyrinth gap may be formed at any of the upper and lower portions of the hard disk drive 1.

Third Modification

Figure 10:
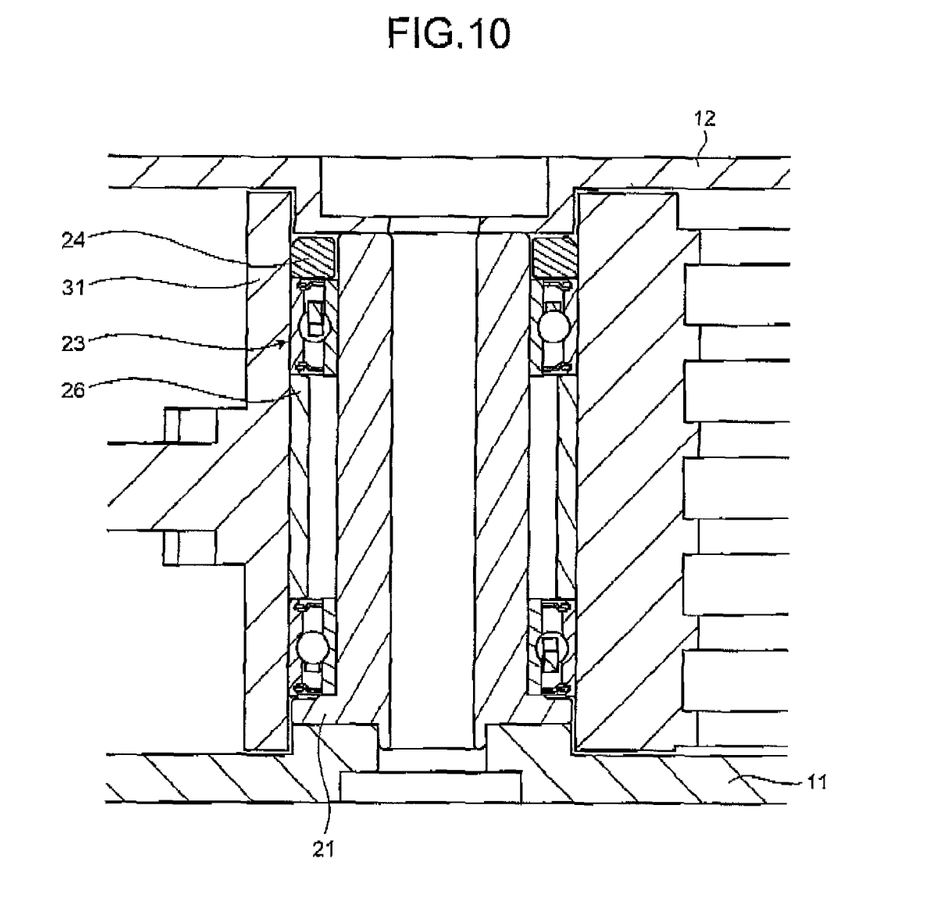
FIG. 10 is a cross-sectional view of a configuration of a modification of the pivot assembly bearing device illustrated in FIG. 9.

FIG. 10 is a cross-sectional view of a configuration of a modification of the pivot assembly bearing device illustrated in FIG. 9. In the second embodiment, the sleeve 22 is disposed between the shaft 21 and the mounting hole 31. However, the sleeve 22 may be omitted and a spacer member 26 configured to position the rolling bearings 23 may be provided between the upper and lower rolling bearings 23, as illustrated in FIG. 10. According to such a configuration, the outer diameter of the shaft 21 can be increased by a thickness of the omitted sleeve 22 in order to increase the axial rigidity of the pivot assembly bearing device, or the pivot assembly bearing device 2 can have a size reduced by the thickness of the omitted sleeve 22, without changing the outer diameter of the shaft 21.

Figure 11:
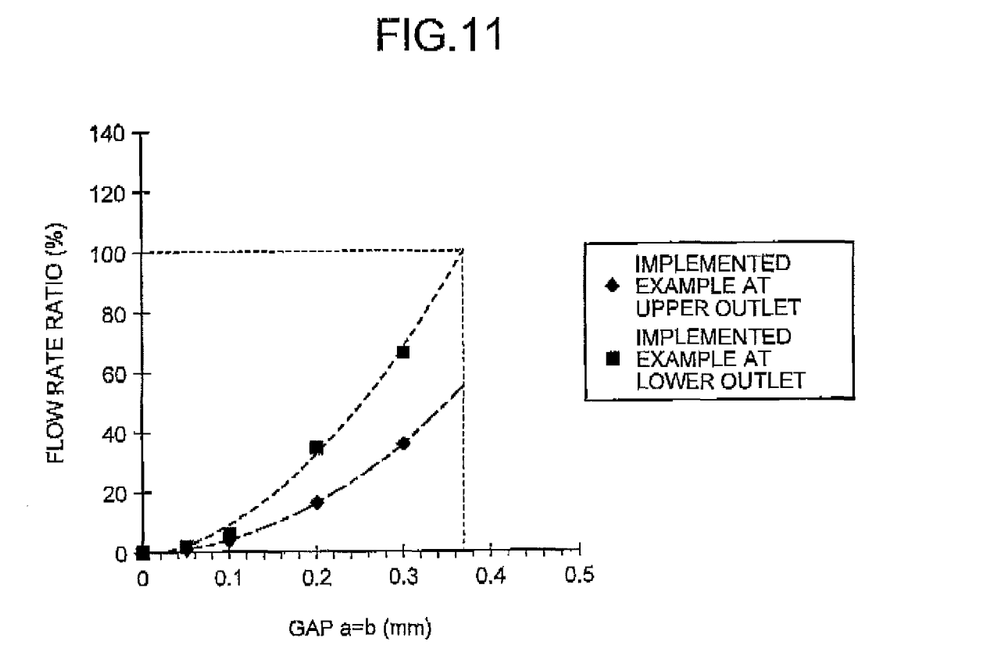
FIG. 11 is a graph illustrating examples of maximum flow rates of airflow on the respective outlet sides of a pivot assembly bearing device according to the present invention and a conventional pivot assembly bearing device.

For the pivot assembly bearing device according to the first embodiment of FIG. 2 (Implemented Example), maximum flow rates of outward airflow in the proximity of the outlet of the labyrinth gap at the upper portion and outward airflow in the proximity of the outlet of the labyrinth gap at the lower portion were evaluated by fluid analysis, changing the gap width "a" of the axial gap and the gap width "b" of the radial gap near each of the upper and lower outlets of the labyrinth gaps. FIG. 4 shows the gap width "a" of the axial gap, the gap width "b" of the radial gap, and outward airflow A4 in the labyrinth gap at the upper portion. The gap width "a" of the axial gap, the gap width "b" of the radial gap, and outward airflow in the labyrinth gap at the lower portion is similar to FIG. 4. In addition, with respect to a conventional pivot assembly bearing device illustrated in FIG. 12, maximum flow rates of outward airflow (airflow A2 illustrated in FIG. 13) around an outlet of a labyrinth gap at an upper portion and outward airflow around an outlet of a labyrinth gap at a lower portion were also determined by fluid analysis. Evaluation results of comparison between a maximum flow rats in a conventional example and maximum flow rate in the Implemented Example are illustrated in FIG. 11. In this evaluation, the gap width "a" is equal to the gap width "b" at both the lower portion and the upper portion. Note that, numerical values in the Implemented Example in FIG. 11 represent the ratio of the maximum flow rate of airflow in the Implemented Example compared to the maximum flow rate of airflow in the conventional example. That is, the maximum flow rate of the conventional example corresponds to 100% in FIG. 11. In FIG. 11, the upper outlet represents the area of the radial gap which is located near the upper end surface of the sleeve in the labyrinth gap formed at the upper portion of the pivot assembly hearing device illustrated in FIG. 2, and the lower outlet represents the area of the radial gap area which is located near the lower end surface of the sleeve in the labyrinth gap formed at the lower portion of the pivot assembly bearing device illustrated in FIG. 2.

As illustrated in FIG. 11, in the Implemented Example, the maximum flow rates of the outward airflow are reduced at the upper outlet and the lower outlet as the widths "a" and "b" are reduced, compared with the conventional example. Therefore, according to the pivot assembly bearing device of the Implemented Example, it was confirmed that formation of the labyrinth gap suppresses discharge of airflow from the outlet side of the pivot assembly bearing device, and the out-particles generated in the pivot assembly bearing device can be kept from scattering outside. In addition, it is predicted from FIG. 11 that when the gap width is not less than 0.37 mm, the maximum flow rate at the lower outlet in the Implemented Example is equal to that of the conventional example. Accordingly, in order to reduce scattering of the out-particles to the outside, the gap width is preferably less than 0.37 mm in the proximity of the outlets of the labyrinth gaps at the upper and lower portions.

The hard disk drive and the pivot assembly bearing device according to the embodiment of the present invention can minimize the deterioration of the cleanliness in the hard disk drive caused by the out-particles originated from the pivot assembly device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A hard disk drive including a pivot assembly bearing device supporting a swing arm, the pivot assembly bearing device having a rolling bearing, a shaft and a sleeve, the rolling bearing having an outer race and an inner race, the shaft having an outer peripheral surface on which the inner race is fixed, the sleeve having an inner peripheral surface on which the outer race is fixed, the hard disk drive comprising: a first convex portion that is cylindrical and/or a second convex portion that is cylindrical, the first convex portion being formed in a cover member positioned on an upper side of the hard disk drive, protruding toward an inside of the hard disk drive, and being fixed to an upper end surface of the shaft, the second convex portion being formed on a base member being positioned on a lower side of the hard disk drive, protruding toward an inside of the hard disk drive, and being fixed to a lower end surface of the shaft, an outer peripheral surface of the first convex portion and/or an outer peripheral surface of the second convex portion being opposed to an inner peripheral surface of the sleeve in a radial direction to form a labyrinth gap.

2. The hard disk drive according to claim 1, further comprising an annular sealing member having an upper surface disposed opposite to the first convex portion, having a lower surface disposed opposite to the inner race of the rolling bearing, having an inner peripheral surface disposed opposite to an outer peripheral surface of the shaft, and having an outer peripheral surface fixed to an inner peripheral surface of the sleeve.

3. The hard disk drive according to claim 2, further comprising a cut-out portion between the upper surface and the outer peripheral surface of the sealing member.

4. The hard disk drive according to claim 1, wherein
the labyrinth gap includes a gap formed by opposing an upper end surface of the sleeve and the cover member and/or a lower end surface of the sleeve and an inner surface of the base member.

5. The hard disk drive according to claim 1, wherein
the labyrinth gap has a gap width of less than 0.37 mm in the proximity of an outlet of the labyrinth gap.

6. A hard disk drive including a pivot assembly bearing device to support a swing arm, the pivot assembly bearing device having a rolling bearing and a shaft and being fitted into a mounting hole formed in the swing arm, the rolling bearing having an outer race and an inner race, the shaft having an outer peripheral surface on which the inner race is fixed, the hard disk drive comprising: a first convex portion that is cylindrical and/or a second convex portion that is cylindrical, the first convex portion being formed in a cover member positioned on an upper side of the hard disk drive, protruding toward an inside of the hard disk drive, and being fixed to an upper end surface of the shaft, the second convex portion being formed on a base member positioned on a lower side of the hard disk drive, protruding toward an inside of the hard disk drive, and being fixed to a lower end surface of the shaft, an outer peripheral surface of the first convex portion and/or an outer peripheral surface of the second convex portion being opposed to an inner peripheral surface of the mounting hole of the swing arm in a radial direction to form a labyrinth gap.

7. The hard disk drive according to claim 6, further comprising an annular sealing member having an upper surface disposed opposite to the first convex portion, having a lower surface disposed opposite to the rolling bearing, having an inner peripheral surface disposed opposite to an outer peripheral surface of the shaft, and having an outer peripheral surface fixed.

8. The hard disk drive according to claim 7, further comprising a cylindrical sleeve having an inner peripheral surface fixed to the outer race, having an outer peripheral surface fitted into the mounting hole of the swing arm, an upper end surface disposed opposite to the first convex portion through a gap, having a lower end surface disposed opposite to the second convex portion through a gap, and having the outer peripheral surface of the sealing member fixed to an inner peripheral surface of the sleeve.

9. The hard disk drive according to claim 7, further comprising a cut-out portion between the upper surface and the outer peripheral surface of the sealing member.

10. The hard disk drive according to claim 6, wherein
the labyrinth gap includes a gap formed by opposing an upper end surface of the mounting hole of the swing arm to an inside surface of the cover member and/or opposing a lower end surface of the mounting hole of the swing arm to an inner surface of the base member.

11. The hard disk drive according to claim 6, wherein
the labyrinth gap has a gap width of less than 0.37 mm in the proximity of an outlet of the labyrinth gap.

* * * * *